US007876700B2

(12) United States Patent
Pacella (10) Patent No.: US 7,876,700 B2
(45) Date of Patent: Jan. 25, 2011

(54) METHOD AND SYSTEM FOR PROVIDING DEFAULT ROUTE ADVERTISEMENT PROTECTION

(75) Inventor: Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 263 days.

(21) Appl. No.: 11/957,002

(22) Filed: Dec. 14, 2007

(65) Prior Publication Data

US 2009/0154357 A1 Jun. 18, 2009

(51) Int. Cl.
*H04L 12/26* (2006.01)
*G06F 15/173* (2006.01)

(52) U.S. Cl. .................. 370/252; 370/392; 370/351; 709/238; 709/239

(58) Field of Classification Search .............. 370/352, 370/254, 252, 241, 351, 389, 392; 709/223, 709/224, 238, 239
See application file for complete search history.

(56) References Cited

U.S. PATENT DOCUMENTS

| | | | | |
|---|---|---|---|---|
| 6,744,739 B2* | 6/2004 | Martin | ................. | 370/254 |
| 6,934,763 B2* | 8/2005 | Kubota et al. | ............... | 709/245 |
| 6,993,593 B2* | 1/2006 | Iwata | .................. | 709/238 |
| 7,293,077 B1 | 11/2007 | Teo et al. | | |
| 2002/0145981 A1* | 10/2002 | Klinker et al. | ............... | 370/244 |
| 2003/0009585 A1* | 1/2003 | Antoine et al. | ............... | 709/238 |
| 2003/0014540 A1* | 1/2003 | Sultan et al. | ................. | 709/240 |
| 2003/0137974 A1* | 7/2003 | Kwan et al. | ................. | 370/352 |
| 2004/0008675 A1* | 1/2004 | Basso et al. | ................. | 370/389 |
| 2004/0037275 A1* | 2/2004 | Li et al. | ................. | 370/370 |
| 2004/0039840 A1* | 2/2004 | Dispensa et al. | ............ | 709/242 |
| 2005/0025129 A1* | 2/2005 | Meier | ................. | 370/352 |
| 2006/0193247 A1 | 8/2006 | Naseh et al. | | |
| 2006/0291378 A1* | 12/2006 | Brotherston et al. | ......... | 370/221 |
| 2008/0062891 A1* | 3/2008 | Van der Merwe et al. | ... | 370/254 |

OTHER PUBLICATIONS

Notification of Transmittal of the International Search Report and the Written Opinion of the International Searching Authority, or the Declaration, dated Feb. 4, 2009.

* cited by examiner

*Primary Examiner*—Chi H Pham
*Assistant Examiner*—Robert Lopata (57) ABSTRACT

A system and method in accordance with exemplary embodiments may include detecting connectivity of a core network element to an internal network. In addition, the system and method may halt advertisement of a default route from the core network element to a network element external to the internal network in response to not detecting connectivity of the core network element to the internal network. The system and method may also allow advertisement of the default route from the core network element to the network element external to the internal network in response to detecting connectivity of the core network element to the internal network.

18 Claims, 7 Drawing Sheets

METHOD AND SYSTEM FOR PROVIDING DEFAULT ROUTE ADVERTISEMENT PROTECTION

BACKGROUND INFORMATION

For many reasons, a particular network element may be configured to reside in an External Border Gateway Protocol (EBGP) network that is external to an Interior Gateway Protocol (IGP) network. Examples of such reasons may include the fact that the network element at issue may not be sufficiently trustworthy, the network element at issue may be associated with a business unit that is distinct from the business unit associated with the IGP, and/or the network element at issue may not be compatible with the IGP. Typically, in a such a network configuration, the outbound data traffic of the external network element may be routed to a primary data path using default route advertisements. A secondary data path may be relied upon in the event of network connectivity failures. For this reason, network administrators may search for automated methods of switching the flow of data traffic from a primary data path to a secondary data path during such failures.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method in accordance with exemplary embodiments may include detecting connectivity of a core network element to an internal network. In addition, the system and method may halt advertisement of a default route from the core network element to a network element external to the internal network in response to not detecting connectivity of the core network element to the internal network. The system and method may also allow advertisement of the default route from the core network element to the network element external to the internal network in response to detecting connectivity of the core network element to the internal network.

The description below describes elements of a communications network that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a communications network, some of which are explicitly shown in figures, others that are not. The inclusion of some physical elements of a network system may help illustrate how a given network may be modeled. It should be noted, however, that all illustrations are purely exemplary and that the default route advertisement protection scheme described herein may be performed on different varieties of networks which may include different physical and logical elements.

Figure 1:
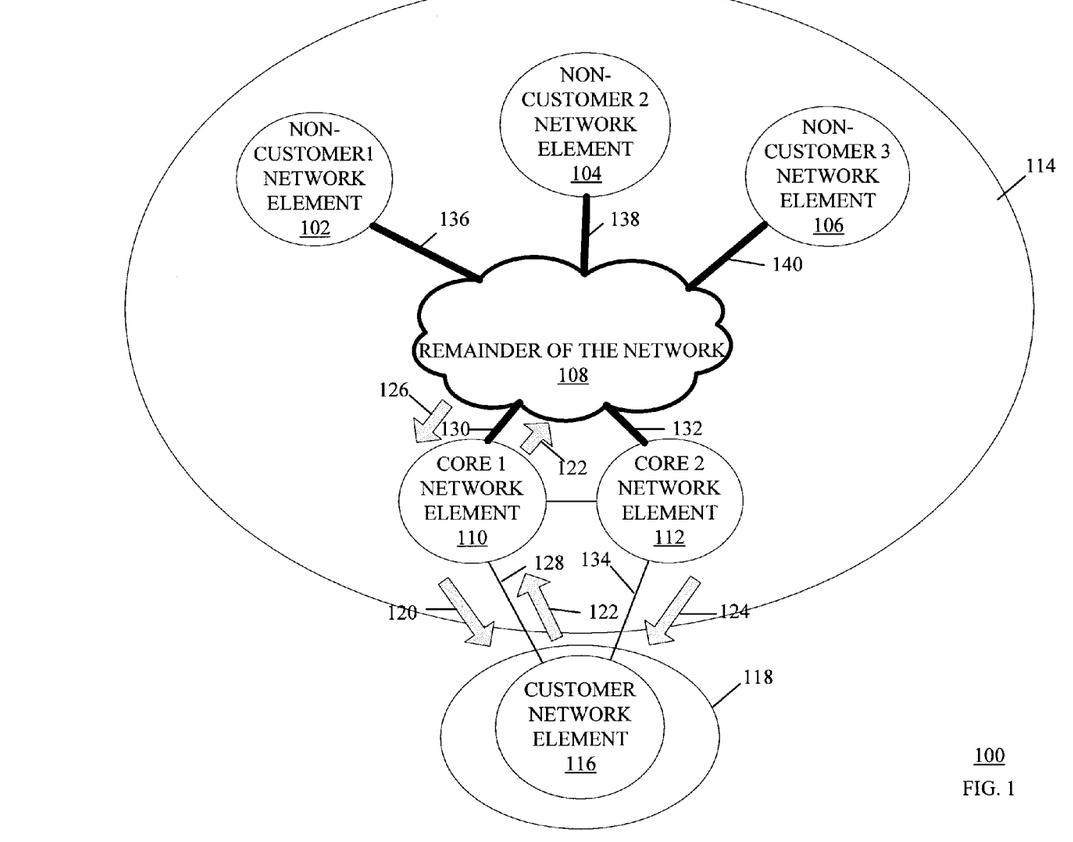
FIG. 1 illustrates a default route topology of a network in accordance with exemplary embodiments.

For instance, network 100 from FIG. 1 illustrates a simplified view of a communications network and various elements in the communications network. It is noted that other hardware and software not depicted may be included in network 100. It is also noted that network 100 illustrates a specific number of instances of a non-customer network elements, a core 1 network element, a core 2 network element, and a customer network element. It will be appreciated that a single instance and/or multiple instances of these entities may be included in a network.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof.

One or more network elements associated with one or more networks may be configured to perform default route advertisement protection. Accordingly, one or more networks elements may be configured to halt advertisement of a default route or allow advertisement of a default route to a customer network element that is external to the network associated with the one or more network elements based on a determination of connectivity to a network.

For example, one or more network elements may be associated with an internal network, such as, an Interior Gateway Protocol (IGP). One or more network elements may also be redundantly configured such that one network element may be considered a primary network element, a second network element may be considered a secondary network element, etc. An additional network element, such as, a customer network element may be associated with a network that is external to the IGP, such as an External Border Gateway Protocol (EBGP). The customer network element may be configured to forward all outbound data traffic to a primary network element, such as a core 1 network element, by receiving a default route advertisement from the primary network element. A core network element may include a router associated with the downstream end of an interior network wherein all outbound data traffic from a customer network element external to the network may be received. In the event of one or more concurrent network connectivity failures, however, the primary network element, may be configured to halt advertisement of a default route such that a redundant network element, such as, the secondary network element may begin to receive all outbound data traffic from the customer network element.

Default route advertisements may be used to control the flow of data from a data source. Default routing may be implemented using aggregate routes. Aggregate routing may include summary information of more specific routing information that may be described by a prefix which may be composed of a network and/or sub-network bitmask portions. For example, the largest possible aggregate may be the default route: 0/0 in Classless InterDomain Routing (CIDR) notation or 0.0.0.0 with a netmask of 0.0.0.0. The 0/0 may represent all network and mask combinations and/or all possible destinations for routing and forwarding. An actual routing destination may include a more specific Internet Protocol (IP) address.

Accordingly, a network that implements aggregate routing may configure a network element to advertise a default route if any routing information is stored in the network element's routing table. A routing table may include routing information that is stored in memory associated with a network element, such as a router. Routing information may include data associated with preferred routes to particular network destinations. As used herein, the phrase "route" will be used to refer to a logical or physical communications pathway, or information describing such a pathway, via which data can be sent to a particular network destination.

In an exemplary embodiment, a network element associated with an IGP and performing aggregate routing may advertise a default route if interface routing information or loopback routing information is received. Interface routing information may include data associated with a direct route to a particular network destination. Loopback routing information may include data associated with logical and/or virtual interface. If the network element is directly connected to a network, the network element may receive specific routing information, such as interface routing information. If, however, the network element is no longer connected to a network, the network element may receive loopback routing information that is learned through the network element's association with the IGP.

FIG. 1 illustrates a default route topology of a network 100 in accordance with exemplary embodiments. Network 100 may include one or more network elements that are configured to perform default route advertisement protection. In particular, network 100 may include an interior network 114 and an exterior network 118.

The interior network 114 may include one or more network elements. For example, the one or more network elements of the interior network 114 may include a core 1 network element 110, a core 2 network element 112, a non-customer 1 network element 102, a non-customer 2 network element 104, and/or a non-customer 3 network element 106. The exterior network 118 may also include one or more network elements. For example, the one or more network elements of the exterior network 118 may include a customer network element 116. In an exemplary embodiment, a network element may include one or more routers and/or any other devices that may be used to forward data along a data path in a network.

As illustrated, a customer network element 116 that is external to the interior network 114 may be coupled to the interior network 114 via data path 128 and data path 134 from the customer network element 116 to the core 1 network element 110 and the core 2 network element 112, respectively. Interior network 114 may couple the core 1 network element 110 to the core 2 network element 112 for redundancy purposes. Interior network 114 may also couple the core 1 network element 110 to the remainder of the network 108 via data path 130. Likewise, interior network 114 may couple the core 2 network element 112 to the remainder of the network 108 via data path 132.

Interior network 114 may couple the non-customer 1 network element 102 to the remainder of the network 108 via data path 136. Interior network 114 may also couple non-customer 2 network element 104 to the remainder of the network 108 via data path 138. Similarly, interior network 114 may couple the non-customer 3 network element 106 to the remainder of the network 108 via data path 140. In an exemplary embodiment, the customer network element 116, the core 1 network element 110, and the core 2 network element 112 may be associated with the downstream portion of network 100. The non-customer 1 network element 102, the non-customer 2 network element 104, and the non-customer 3 network element 106 may be associated with the upstream portion of network 100. Accordingly, data traffic originating from the customer network element 116 may be configured to flow from the downstream portion of network 100 to the upstream portion of network 100. As used herein, the phrase "data traffic" will be used to refer to a packet, datagram, frame, message, segment, or any other logical information that is conveyed via a network.

In an exemplary embodiment, core 1 network element 110 may be configured to be a primary (i.e., preferred) destination of outbound data traffic flowing from the customer network element 116 using a control routing policy. In addition, the core 2 network element 112 may be configured to be a secondary destination of outbound data traffic flowing from the customer network element 116 using the control routing policy. A control routing policy may include a set of one or more rules used to determine how data traffic associated with a network should be conveyed. In an exemplary embodiment, the implementers of network 100 may configure the control routing policy based on design needs and/or preferences.

In an exemplary embodiment, core 1 network element 110 may be configured to advertise a default route 120 to the customer network element 116 if core 1 network element 110 has received any routing information from the remainder of the network 108. Core 2 network element 112 may also be configured to advertise a default route 124 to the customer network element 116 if core 2 network element 112 has received any routing information from the remainder of the network 108. For example, such a default route may elicit the customer network element 116 to forward all outbound data traffic to the advertising network element. Based on the designation of the core 1 network element 110 as the primary and/or preferred destination of the outbound data traffic 122 of the customer network element 116 and core 1 network element's 110 advertisement of the default route, customer network element 116 may forward all outbound data traffic 122 to the core 1 network element 110 via data path 128. Core 1 network element 110 may also be configured to forward the outbound data traffic 122 to the remainder of the network 108 via data path 130 based on interface routing information 126 received from one or more network elements associated with the remainder of the network 108.

Non-customer 1 network element 102, non-customer 2 network element 104, and non-customer 3 network element 106 may include peering routers and/or an IGP control class of routers that may be configured such that they may not directly connect to a customer facing network element, such as core 1 network element 110 and/or core 2 network element 112. Non-customer 1 network element 102, non-customer 2 network element 104, and non-customer 3 network element 106 may also be associated with a unique Internet Protocol (IP) address space. For example, the implementers of network 100 may associate non-customer 1 network element 102, non-customer 2 network element 104, and non-customer 3 network element 106 with loopback addresses that are unique from the loopback addresses associated with all other network elements in network 100. As previously discussed, loopback addresses may include addresses that may remain active independently of the state of any physical interface. Accordingly, loopback addresses remain active despite some failures in a network.

The interior network 114 may include an Interior Gateway Protocol (IGP) associated with an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks. In an exemplary embodiment, the interior network 114 may include one or more networks operating as a stand-alone network or in cooperation with each other. Use of the term network herein is not intended to limit the network to a single network.

The exterior network 118 may include an Exterior Border Gateway Protocol (EBGP) associated with an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks. In an exemplary embodiment, the exterior network 118 may include one or more networks operating as a stand-alone network or in cooperation with each other.

In the event of concurrent network connectivity failures, the core 1 network element 110 may become disconnected from the core 2 network element 112 and the remainder of the network 108. The core 1 network element 110 and/or the core 2 network element 112 may include software and/or hardware to implement default route advertisement protection such that the core 1 network element 110 does not advertise the default route to the customer network element 116. Accordingly, the customer network element's 116 outbound data traffic 122 may be forwarded to the core 2 network element via data path 134. The core 1 network element 110 and/or the core 2 network element 112 are discussed in further detail below with reference to FIG. 5.

Figure 2:
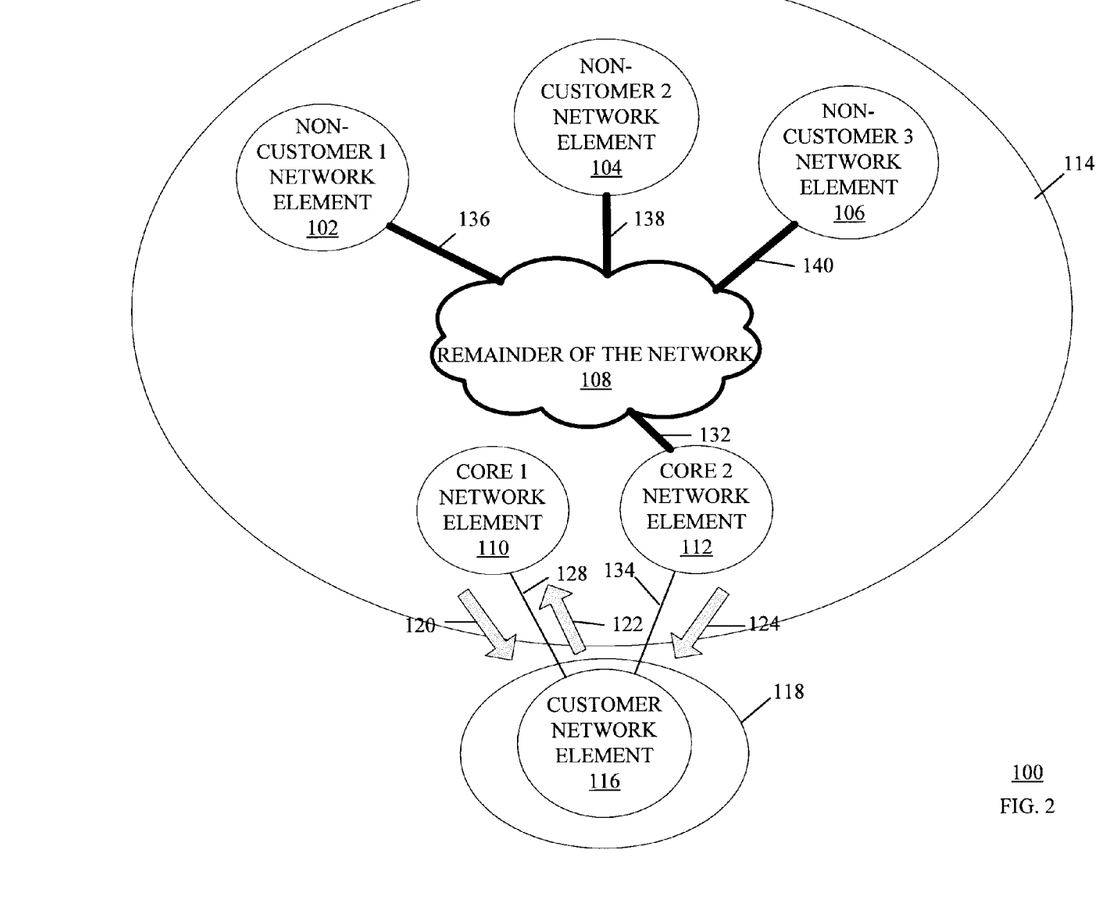
FIG. 2 illustrates a network element isolation event topology of a network in accordance with exemplary embodiments.

FIG. 2 illustrates a network element isolation event topology of a network 100 in accordance with exemplary embodiments. As previously discussed, in the event of concurrent network connectivity failures, the core 1 network element 110 may become disconnected from the core 2 network element 112 and the remainder of the network 108. Accordingly, the connection between the core 1 network element 110 and the core 2 network element 112 may be lost. In addition, the connection between the core 1 network element 110 and the remainder of the network 108 may be lost.

In such an event, without the use of default route advertisement protection, the core 1 network element 110 may continue to advertise the default route 120 to the customer network 116. Accordingly, the customer network element 116 may continue to forward outbound data traffic 122 to the core 1 network element 110. Given that the core 1 network element 110 may no longer receive the interface routing information necessary to forward the outbound data traffic 122 to the remainder of the network 108, the outbound data traffic 122 may be lost.

Figure 3:
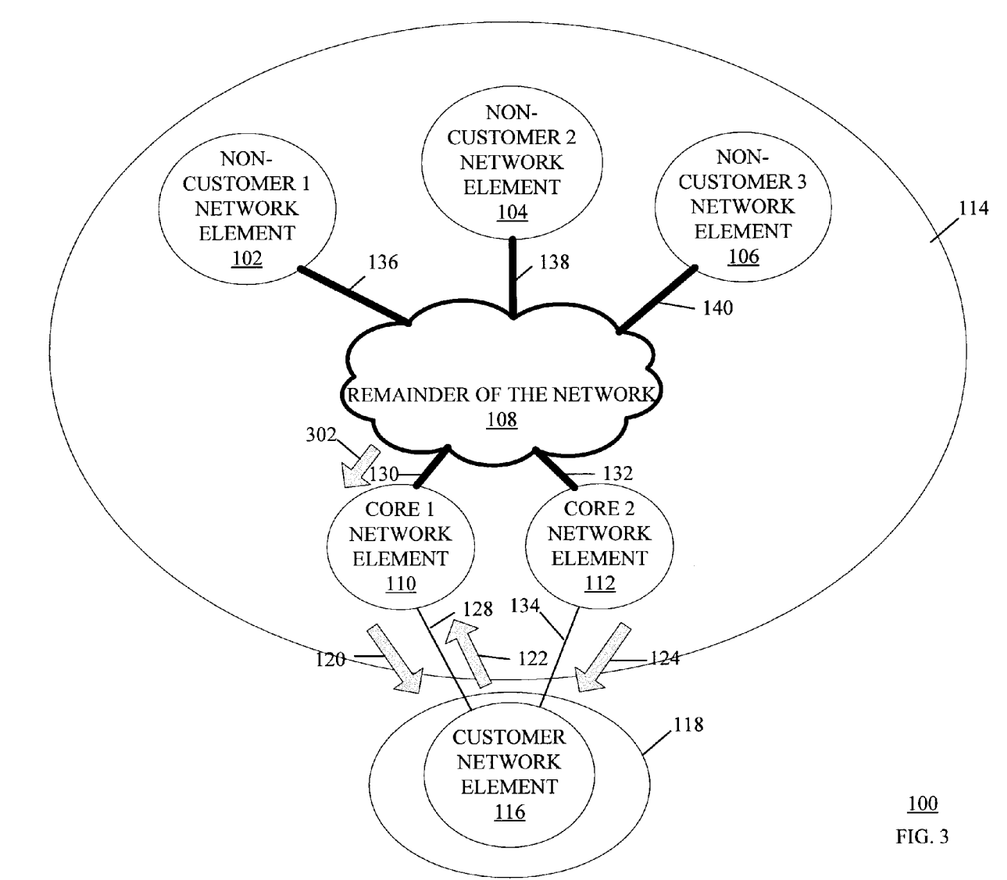
FIG. 3 illustrates a non-customer router loopback contribution topology of a network in accordance with exemplary embodiments.

FIG. 3 illustrates a non-customer router loopback contribution topology of a network 100 in accordance with exemplary embodiments. As previously discussed, the non-customer 1 network element 102, the non-customer 2 network element 104, and/or the non-customer 3 network element 106 may be associated with unique loopback IP addresses. Based on the connectivity failure between the core 1 network element 110 and the remainder of the network 108 and the core 1 network element 110 and the core 2 network element 112, the core 1 network element 110 may begin to receive loopback routing information 302 from the interior network 114 by virtue of core 1 network element's 110 association with the interior network 114. It should be noted that a single loopback address contribution from any of the non-customer routers may be sufficient. Accordingly, a single non-customer router functioning in the interior network 114 associated with a unique loopback address may provide loopback routing information to the core 1 network element 110. In an exemplary embodiment, one or more non-customer network elements may be associated with one or more loopback addresses that are in contiguous address space.

In an exemplary embodiment, the routing table associated with the core 1 network element 110 may receive the loopback routing information 302 via core 1 network element's 110 remaining connection to the interior network 114. More specifically, an IGP table stored as part of the routing table may receive the loopback routing information 302 via core 1 network element's 110 remaining connection to the interior network 114. An IGP table may include a database comprised of routes and associated link metrics used by the IGP to determine the "best" path from a local router to a destination address based on the given criteria. Links may include connection points from one IGP routing node to another. Metrics may include one or more router "hops", distance, bandwidth of links, and/or other operator-defined variables.

Figure 4:
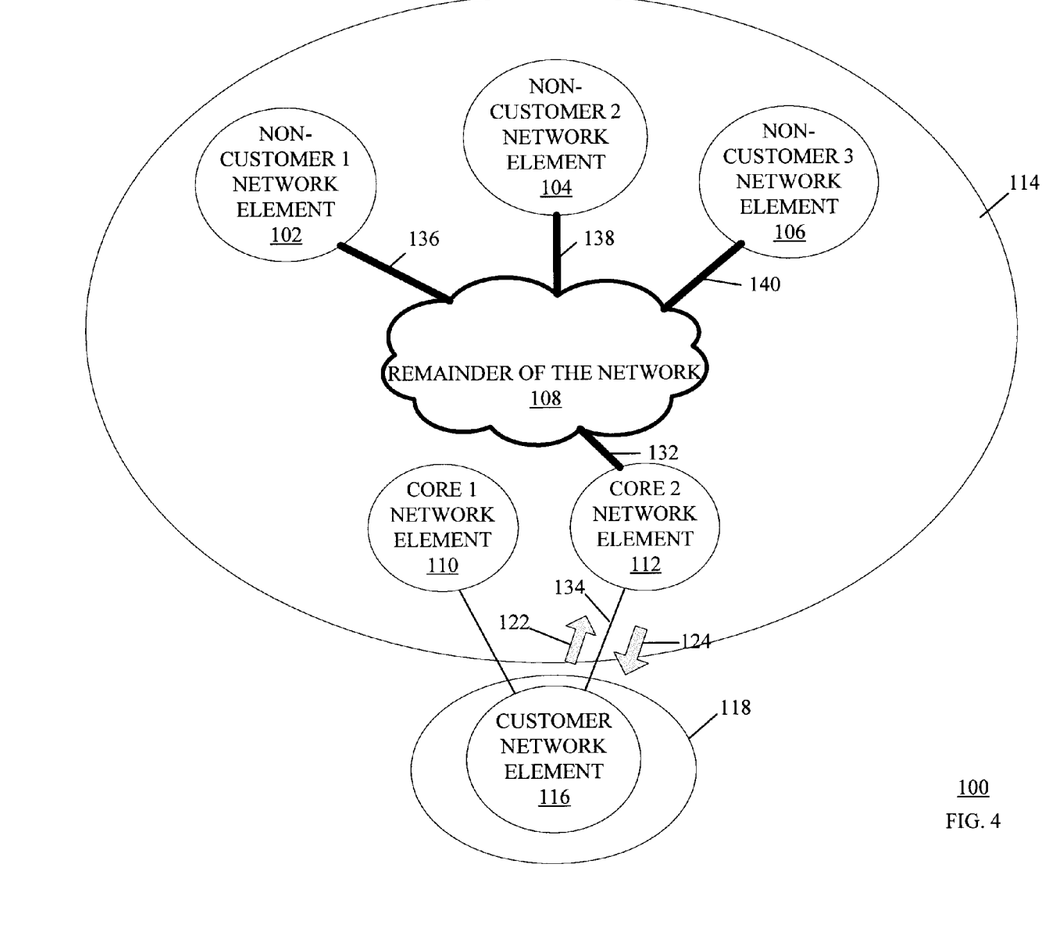
FIG. 4 illustrates a default route protection topology of a network in accordance with exemplary embodiments.

FIG. 4 illustrates a default route protection topology of a network 100 in accordance with exemplary embodiments. A control routing policy associated with the interior network 114 may be configured such that the core 1 network element 110 halts advertisement of the default route if unique loopback routing information 302 associated with the non-customer 1 network element 102, the non-customer 2 network element 104, or the non-customer 3 network element 106 is not received. Accordingly, the core 1 network element 110 may no longer advertise the default route to the customer network element 116 if all of the non-customer routers are not functional to supply unique loopback routing information to the core 1 network element 110.

Since the core 2 network element 112 maintains the advertisement of the default route 124, the customer network 116 may stop forwarding outbound data traffic 122 to the core 1 network element 110 and start forwarding outbound data traffic 122 to the core 2 network element 112. Based on the core 2 network element's 112 connectivity to the remainder of the network 108, the core 2 network element 112 may forward the outbound data traffic 122 to the remainder of the network 108.

Figure 5:
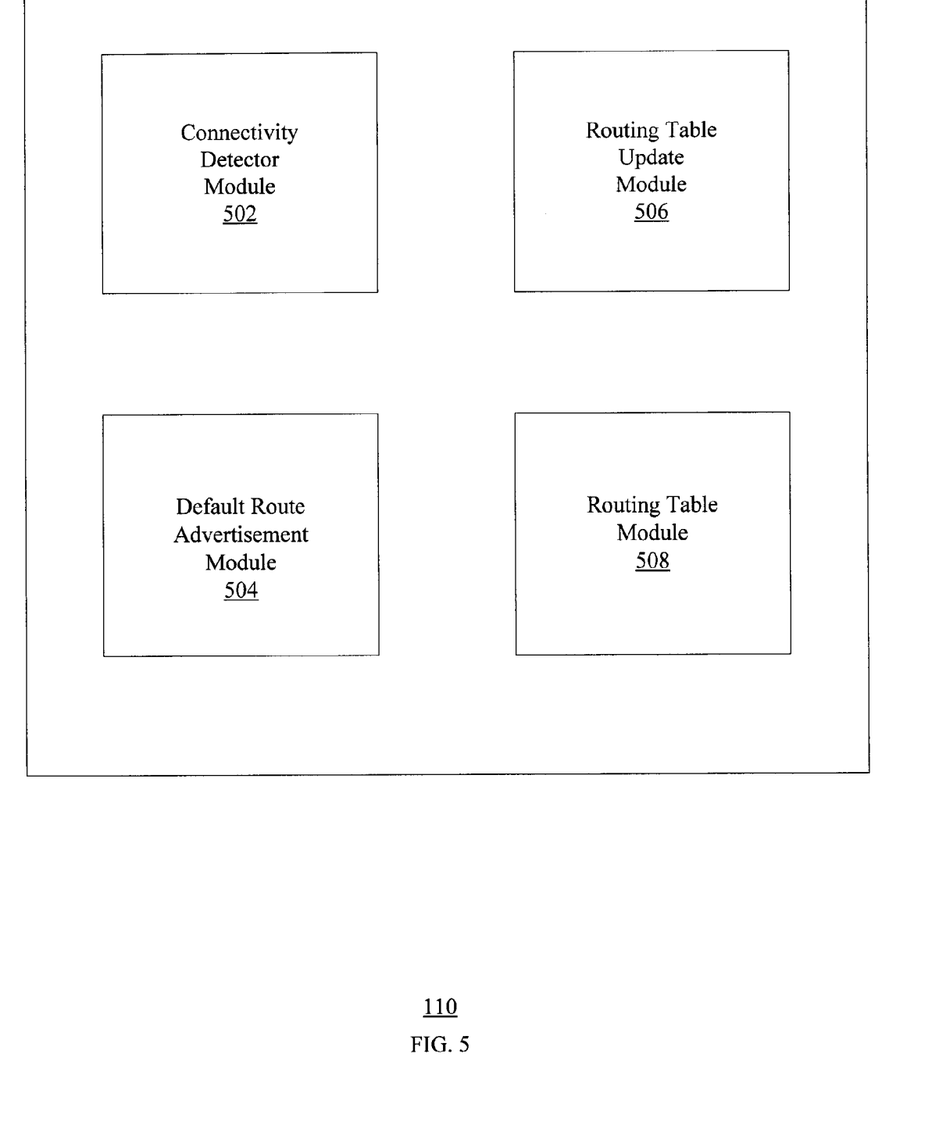
FIG. 5 illustrates exemplary modules of a core network element in accordance with exemplary embodiments.

FIG. 5 illustrates exemplary modules of the core 1 network element that is configured to perform default route advertisement protection in accordance with exemplary embodiments. In an exemplary embodiment, the core 1 network module 110 and/or the core 2 network module 112 may include a connectivity detector module 502, a default route advertisement module 504, a routing table update module 506, and a routing table module 508. It is noted that the modules 502, 504, 506, and 508 are exemplary. The functions of the modules 502, 504, 506, and 508 may be performed at other modules remote or local to the core 1 network module 110, and the modules 502, 504, 506, and 508 may be combined and/or separated. It is also noted that the modules 502, 504, 506, and 508 may be included in any other network element associated with the interior network 114.

Default route advertisement module 504 may include software and/or hardware configured to manage the advertisement of the default route. Accordingly, the default route advertisement module 504 may generate, send, and/or advertise a default route based on updates to routing tables associated with the routing table module 508 and/or information received from the connectivity detector module 502. The default route advertisement module 504 may also be configured to receive advertisements from other network elements associated with the interior network 114 and may transmit information associated with the advertisements to routing table update module 506.

Based on a control routing policy associated with the interior network 114, the default route advertisement module 504 may be configured to halt the advertisement of the default route upon receipt of the determination that the core 1 network element 110 is no longer directly connected to the remainder of the network 108 and the core 2 network element 112 from the connectivity detector module 502. Based on the control policy associated with the interior network 114, the default route advertisement module 504 may also be configured to allow the advertisement of the default route upon receipt of the determination that the core 1 network element 110 is directly connected to either the remainder of the network 108 or the core 2 network element 112 from the connectivity detector module 502.

Routing table update module 506 may include software and/or hardware configured to maintain one or more routing tables associated with the routing table module 508. A routing table may include one or more specific routing tables. For example, a routing table may include an IGP routing table. The number of specific routing tables included in the routing table may be increased based on the number of routing protocols associated with a network element.

Routing table update module 506 may maintain one or more routing tables by adding routes to and/or removing routes from the one or more routing tables. Routing table update module 506 may also replace existing routes within the one or more routing tables. In addition, routing table update module 506 may transmit one or more updated routing table and/or a portion of one or more updated routing tables to other modules associated with the core 1 network element 110.

Connectivity detector module 502 may include software and/or hardware configured to determine whether the core 1 network element 110 is directly connected to the remainder of the network 108 and/or directly connected to the core 2 network element 112. Based on a control routing policy associated with the interior network 114, connectivity detector module 502 may access one or more routing tables associated with the routing table module 508. Connectivity detector module 502 may also access and/or receive information from the interior network 114 associated with the unique loopback addresses associated with one or more non-customer routers.

If, for example, the connectivity detector module 502 accesses specific interface routing information in the routing tables, the connectivity detector module 502 may determine that the core 1 network element 110 is connected to either the remainder of the network 108 or the core 2 network element 112 and may transmit that determination to the default route advertisement module 504.

If, however, the connectivity detector module 502 does not access specific interface routing information in the routing tables and accesses loopback routing information, the connectivity detector module 502 may compare the loopback routing information to the unique loopback addresses associated with one or more non-customer routers. If the loopback routing information does not include at least one unique loopback address, the connectivity detector module 502 may determine that the core 1 network element 110 is not connected to either the remainder of the network 108 or the core 2 network element 112 and may transmit that determination to the default route advertisement module 504. Accordingly, the default route advertisement module 504 may withdraw the default route based on this transmitted information.

Figure 6:
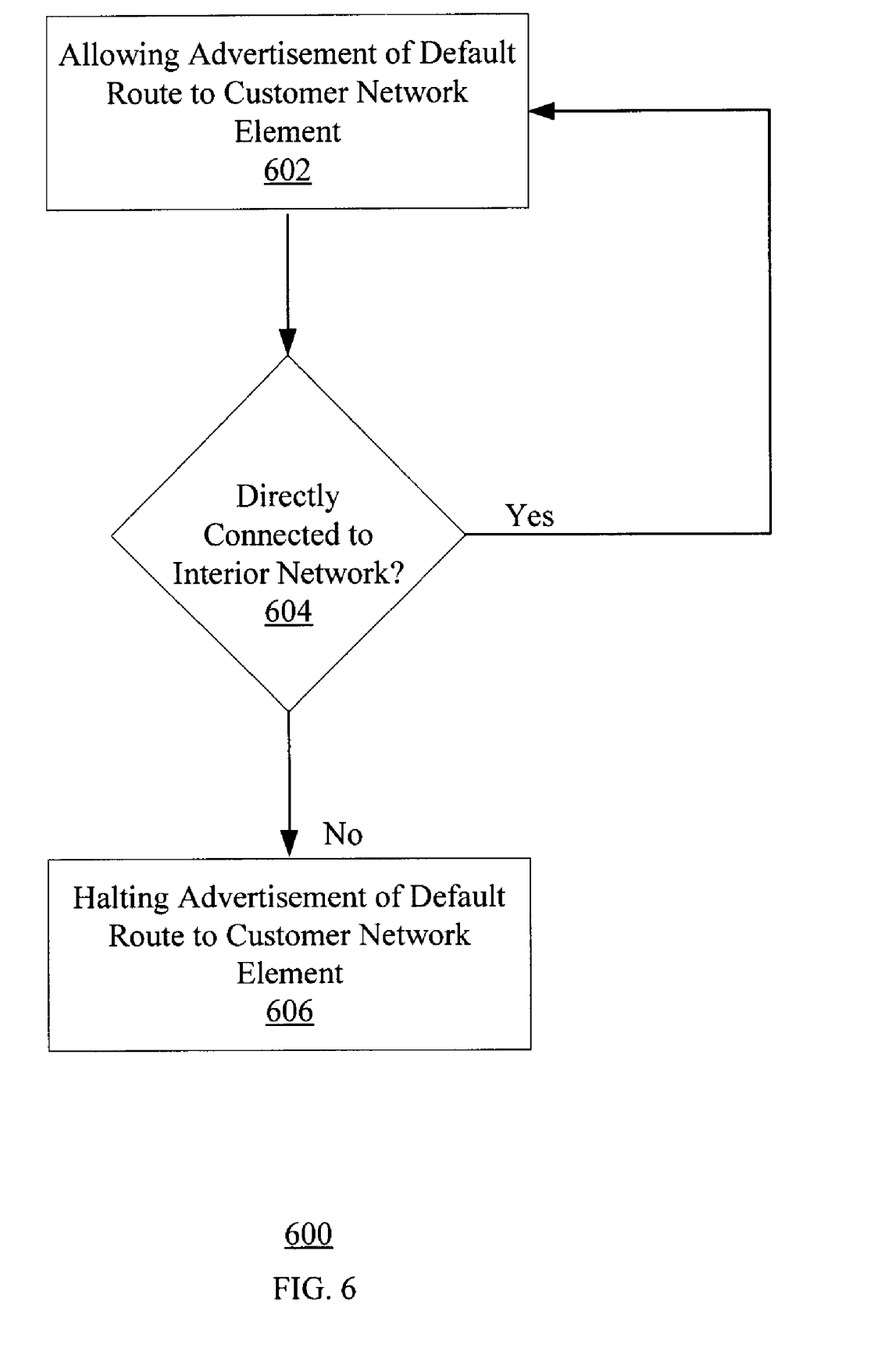
FIG. 6 illustrates a method for providing default route advertisement protection in accordance with exemplary embodiments.

FIG. 6 illustrates a method 600 for providing default route advertisement protection in accordance with exemplary embodiments. This exemplary method is provided by way of example, as there are a variety of ways to carry out methods disclosed herein. The method 600 shown in FIG. 6 can be executed or otherwise performed by one or a combination of various networks and/or network elements. The method 600 is described below as carried out by the core 1 network element 110 shown in FIG. 1 by way of example, and various elements of the core 1 network element 110 of network 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

In block 602, the method 600 may include the core 1 network element 110 allowing the default route to be advertised to the customer network element 116. The default route may include interface routing information for the customer network element 116 to reference in forwarding the outbound data traffic to the core 1 network element 110. Based on core 1 network element's 110 advertisement of the default route and designation as the primary (i.e., preferred) destination, the core 1 network element 110 may receive the outbound data traffic from the customer network element 116. The method 600 may continue to block 604.

In block 604, the method 600 may include the core 1 network element 110 determining whether the core 1 network element 110 remains connected to either the remainder of the network 108 or the core 2 network element 112, which may be redundantly coupled to the core 1 network element 110. If, for example, the core 1 network element 110 makes a determination that the core 1 network element 110 is directly connected to either the remainder of the network 108 or the core 2 network element 112, the core 1 network element 110 may continue to allow the default route to be advertised to the customer network element 116 in block 602. If, however, the core 1 network element 110 makes a determination that the core 1 network element 110 is not directly connected to neither the remainder of the network 108 nor the core 2 network element 112, the core 1 network element may halt the default route from being advertised to the customer network element 116 in block 606. The method 600 may continue to block 606.

In block 606, the method 600 may include the core 1 network element 110 halting the advertisement of the default route to the customer network element 116. Based on the configuration of the interior network 114, the core 2 network element 112 may then receive the outbound data traffic of the customer network element 116. The method 600 may then end.

Figure 7:
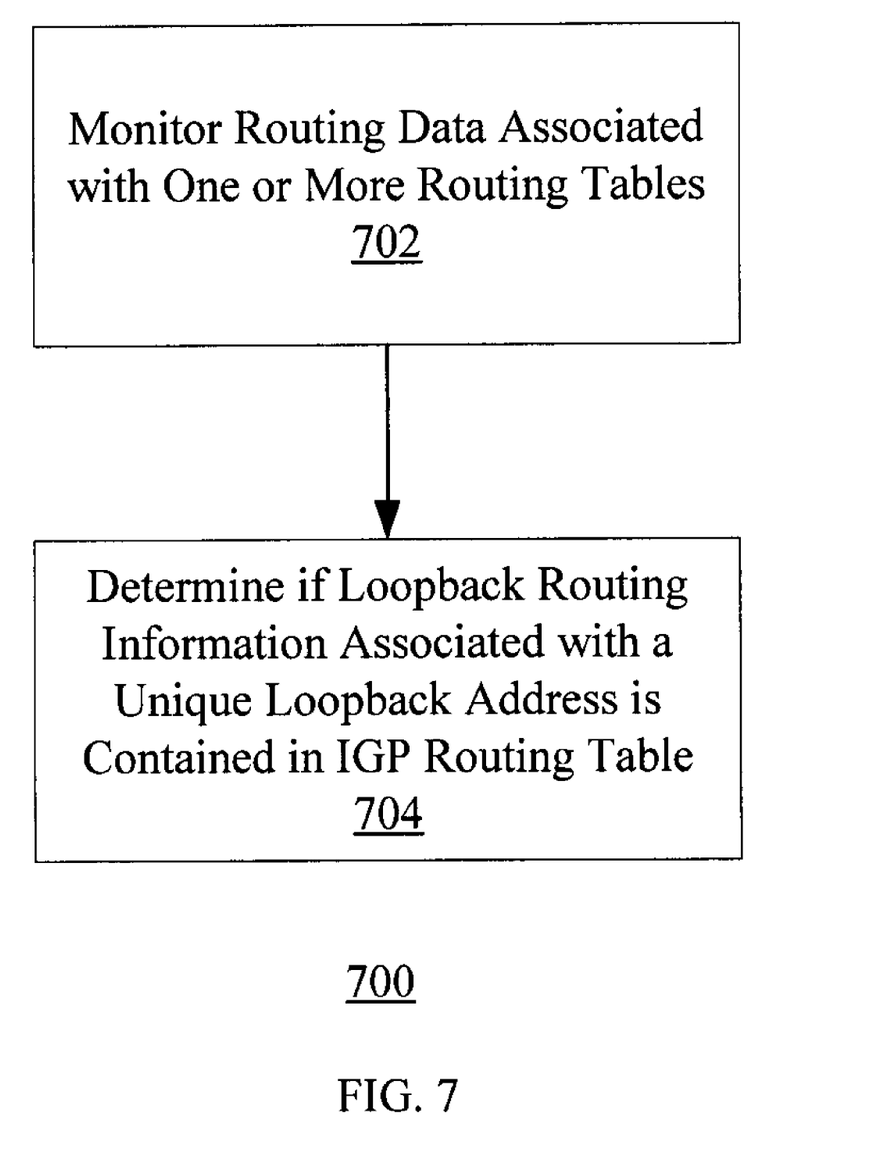
FIG. 7 illustrates a method for determining connectivity in a interior network for the process of performing default route advertisement protection in accordance with exemplary embodiments.

FIG. 7 illustrates a method 700 for determining connectivity in an interior network for the process of performing default route advertisement protection in accordance with exemplary embodiments. This exemplary method is provided by way of example, as there are a variety of ways to carry out methods disclosed herein. The method 700 shown in FIG. 7 can be executed or otherwise performed by one or a combination of various networks and/or network elements. The method 700 is described below as carried out by the core 1 network element 110 shown in FIG. 1 by way of example, and various elements of the core 1 network element 110 of network 100 are referenced in explaining the example method of FIG. 7. Each block shown in FIG. 7 represents one or more processes, methods, or subroutines carried in the exemplary method 700. Referring to FIG. 7, the exemplary method 700 may begin at block 702.

In block 702, the method 700 may include the core 1 network element 110 monitoring the IGP routing table for one or more unique loopback addresses associated with the non-customer routers. Based on a control routing policy associated with the interior network 114, a connectivity detector module 502 may access one or more routing tables associated with a routing table module 508 using communication mechanisms internal to the core 1 network element 110. The one or more routing tables may include an IGP routing table associated with an IGP. The method 700 may continue to block 704.

In block 704, may determine whether the IGP routing table contains one or more unique loopback addresses associated with the non-customer routers. A connectivity detector module 502 may access and/or receive information from the interior network 114 associated with the unique loopback addresses associated with one or more non-customer routers. If, for example, the connectivity detector module 502 accesses specific interface routing information in the routing tables, the connectivity detector module 502 may determine that the core 1 network element 110 is connected to either the remainder of the network 108 or the core 2 network element 112.

If, however, the connectivity detector module 502 does not access specific interface routing information in the routing tables and accesses loopback routing information associated with an IGP routing table, the connectivity detector module 502 may compare the loopback routing information to the unique loopback addresses associated with one or more non-customer routers. If the loopback routing information does not include at least one unique loopback address, the connectivity detector module 502 may determine that the core 1 network element 110 is not connected to either the remainder of the network 108 or the core 2 network element 112. The method 704 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
   detecting connectivity of a primary core network element to an internal network by determining whether the primary core network element is communicatively coupled to at least a secondary core network element based on receipt of address data from one or more non-customer network elements associated with a unique loopback address space at the primary core network element;
   halting advertisement of a default route from the primary core network element to a network element external to the internal network in response to not detecting connectivity of the primary core network element to the internal network; and
   allowing advertisement of the default route from the primary core network element to the network element external to the internal network in response to detecting connectivity of the primary core network element to the internal network.

2. The method of claim 1, wherein the internal network is associated with an Interior Gateway Protocol (IGP).

3. The method of claim 1, wherein the one or more non-customer network elements are associated with the internal network.

4. The method of claim 2, wherein detecting connectivity of the primary core network element to the internal network further comprises monitoring the route table associated with the primary core network element.

5. The method of claim 4, wherein monitoring the route table further comprises monitoring the Interior Gateway Protocol (IGP) table associated with the primary core network element.

6. The method of claim 4, further comprises applying a control routing policy to one or more network elements associated with the internal network.

7. The method of claim 6, wherein the control routing policy is configured to allow the advertisement of the default route from the primary core network element in the event of the Interior Gateway Protocol (IGP) table associated with the primary core network element storing one or more addresses associated with the unique loopback address space.

8. The method of claim 6, wherein the control routing policy is configured to halt the advertisement of the default route from the primary core network element in the event of the Interior Gateway Protocol (IGP) table associated with the primary core network element not storing one or more addresses associated with the unique loopback address space.

9. The method of claim 1, wherein the network element external to the internal network comprises a customer network element.

10. The method of claim 9, wherein the default route comprises a request to the customer network element to forward all outbound data traffic to the primary core network element.

11. The method of claim 9, wherein the customer network element is associated with an External Border Gateway Protocol (EBGP).

12. The method of claim 1, wherein the primary core network element is associated with a primary default routing path.

13. A non-transitory computer readable medium storing an executable program comprising instructions to perform the method of claim 1.

14. A system comprising:
   a connectivity detector computing apparatus configured to determine whether a primary core network element is connected to an internal network by determining whether the primary core network element is communicatively coupled to at least a secondary core network element based on receipt of address data from one or more non-customer network elements associated with a unique loopback address space at the primary core network element;
a default route advertisement computing apparatus configured to advertise a default route based on the connectivity determination made by the connectivity detector module; and
a routing table computing apparatus configured to store at least one routing table.

15. The system of claim 14, wherein the connectivity detector module is further configured to apply a control routing policy.

16. The system of claim 15, wherein the control routing policy is configured to allow the advertisement of the default route from the primary core network element in the event of an Interior Gateway Protocol (IGP) table associated with primary core network element storing one or more addresses associated with a the unique loopback address space.

17. The system of claim 15, wherein the control routing policy is configured to halt the advertisement of the default route from the primary core network element in the event of an Interior Gateway Protocol (IGP) table associated with the primary core network element not storing one or more addresses associated with the unique loopback address space.

18. A method comprising:
detecting connectivity of a primary core network element to an internal network by determining whether the primary core network element is communicatively coupled to at least a secondary core network element based on receipt of address data from one or more non-customer network elements associated with a unique loopback address space at the primary core network element;
halting advertisement of a default route from the primary core network element to a network element external to the internal network in response to not detecting connectivity of the primary core network element to the internal network; and
allowing advertisement of the default route from the primary core network element to the network element external to the internal network in response to detecting connectivity of the primary core network element to the internal network,
wherein a control routing policy is configured to allow the advertisement of the default route from the primary core network element in the event of an Interior Gateway Protocol (IGP) table associated with the primary core network element storing one or more addresses associated with a unique Internet Protocol (IP) address space.

* * * * *